United States Patent
Chung et al.

(10) Patent No.: US 7,149,428 B2
(45) Date of Patent: Dec. 12, 2006

(54) OSNR MONITORING METHOD AND APPARATUS USING TUNABLE OPTICAL BANDPASS FILTER AND POLARIZATION NULLING METHOD

(75) Inventors: Yun Chur Chung, Daejeon (KR); Seung Kyun Shin, Daejeon (KR); Chul Han Kim, Goyang-si (KR)

(73) Assignee: Teralink Communications, Inc., Daejeon (KR)

( * ) Notice: Subject to any disclaimer, the term of this patent is extended or adjusted under 35 U.S.C. 154(b) by 741 days.

(21) Appl. No.: 10/442,891

(22) Filed: May 20, 2003

(65) Prior Publication Data

US 2004/0114923 A1     Jun. 17, 2004

(30) Foreign Application Priority Data

Dec. 16, 2002   (KR) ............. PCT/KR02/02365

(51) Int. Cl.
*H04J 14/00*    (2006.01)
*H04B 10/08*    (2006.01)

(52) U.S. Cl. .................... 398/68; 398/26; 398/33
(58) Field of Classification Search ............ 398/68, 398/33, 26, 65, 85, 152, 184, 205; 359/15, 359/251, 304
See application file for complete search history.

(56) References Cited

U.S. PATENT DOCUMENTS

| | | | |
|---|---|---|---|
| 5,223,705 A | 6/1993 | Aspell et al. | |
| 5,917,649 A * | 6/1999 | Mori et al. | 359/341.31 |
| 6,040,933 A | 3/2000 | Khaleghi et al. | |
| 8,384,956 | 5/2002 | Shieh | |
| 6,678,431 B1 * | 1/2004 | Han et al. | 385/11 |
| 6,952,529 B1 * | 10/2005 | Mittal | 398/26 |

* cited by examiner

*Primary Examiner*—David Robertson
*Assistant Examiner*—Ralph Jean-Bart
(74) *Attorney, Agent, or Firm*—Graybeal Jackson Haley LLP

(57) ABSTRACT

The present invention provides a method and an apparatus for monitoring optical signal to noise ratio (OSNR) in a wavelength division multiplexing optical transmission system. The present invention utilizes a polarization nulling method and a tunable optical bandpass filter in order to reliably monitor the OSNR by considering a finite polarization nulling ratio, polarization mode dispersion and non-linear birefringence of the optical system in real time measurement of the OSNR. Further, the tunable optical bandpass filter is controlled to filter all wavelength bands of wavelength division multiplexed signals. Since the invention may monitor a plurality of demultiplexed optical signals with a single apparatus, the overall cost of the OSNR monitoring equipment is significantly reduced.

23 Claims, 8 Drawing Sheets

OSNR MONITORING METHOD AND APPARATUS USING TUNABLE OPTICAL BANDPASS FILTER AND POLARIZATION NULLING METHOD

PRIORITY CLAIM

This application claims priority from PCT Patent Application No. PCT/KR02/02365 filed 16 Dec. 2002, which is herein incorporated by reference.

TECHNICAL FIELD

The present invention relates to a method and apparatus for monitoring optical signal to noise ratio (OSNR) in an optical communication network, and more particularly, to a method and apparatus for automatically monitoring OSNR of each optical channel of a wavelength division multiplexing (WDM) optical transmission system by utilizing tunable optical bandpass filter and polarization nulling method.

BACKGROUND ART

For reliable operation and management of an ultra-high-capacity WDM optical communication network, close monitoring on the transmission performance and characteristics of the system is essentially required. OSNR is defined as the ratio of the power of optical signal to that of noise signal being transmitted in a certain optical signal band. Exact measuring of ratio makes it possible to diagnose the performance of the optical transmission system.

In a conventional OSNR measuring method, OSNR is measured by linearly interpolating the intensity of an amplified spontaneous emission (ASE) noise in an optical signal band based on the intensity of the ASE noise in other bands outside the optical signal band (H. Suzuki and N. Takachino, Electronics Letter Vol. 35, pp. 836–837, 1999). In the linear interpolation method, the ASE noise of an optical signal band is estimated to be equivalent to the constant ASE noise of the other bands. Referring to FIG. 1, the ASE noise of each signal band is estimated to be at the level shown with dotted lines. Accordingly, the OSNR of each signal band is determined based on thus estimated ASE noise.

As shown in FIG. 2, however, in a WDM optical transmission system where respective optical signals may pass through different optical paths and through different numbers of erbium-doped fiber amplifiers (EDFAs), the ASE noise included in each optical signal band may vary from band to band. The actual ASE noise included in the optical signal bands of such transmission system should be different from the ASE noise, which was estimated by the linear interpolation method as shown in FIG. 1. Therefore, it is impossible to correctly measure the OSNR by using linear interpolation method.

In order to solve the above problem, Korean Patent No. 341825 entitled "OSNR Monitoring Method and Apparatus Using Polarization Nulling Method" discloses a method of measuring OSNR by polarization nulling method, which utilizes the polarization characteristics of the optical signal and of the ASE noise. A conventional OSNR measurement using the polarization nulling method will be described below with reference to FIG. 3. A wavelength division-multiplexed optical signal including an ASE noise is demultiplexed by a waveguide diffraction grating 11. An optical signal having a polarization characteristic sequentially passes through a quarter-wave plate 12 and a linear polarizer 13. For example, if the quarter-wave plate 12 rotates at a rate of 15 Hz and the linear polarizer 13 rotates at a rate of 0.1 Hz, the minimum power and the maximum power of the optical signal may be measured based on the polarization characteristics of the optical signal including the ASE noise. When the polarization state of the linear polarizer 13 and the polarization state of the optical signal being output from the quarter-wave plate 12 conform to each other, the power of the measured optical signal is maximized. On the other hand, when the polarization state of the linear polarizer 13 and the polarization state of the optical signal being output from the quarter-wave plate 12 are orthogonal to each other, the optical signal component is blocked and only the ASE noise component is outputted. Thus, the power of the measured optical signal is minimized.

The optical signal that has passed through the linear polarizer 13 is converted into an electrical voltage by means of a photo detector 14. Then, the voltage is amplified by a log amplifier 15 and is transmitted and displayed on an oscilloscope 16. A computer 17 calculates the minimum power and the maximum power from the voltage displayed on the oscilloscope 16. From the maximum and the minimum power, the computer 17 calculates the signal power and its ASE noise and then determines a signal to noise ratio of the optical signal.

A conventional OSNR monitoring method employing only polarization nulling method assumes that the polarization nulling function of the linear polarizer 13 is ideal, that is, the nulling ratio is infinite. The method, however, does not consider a case where the polarization nulling ratio of the linear polarizer 13 is finite. Further, the conventional OSNR monitoring method does not consider a phenomenon that the polarization of the optical signal is disturbed due to polarization mode dispersion and non-linear birefringence of the optical fiber. Accordingly, the conventional OSNR monitoring method has a limited use.

Polarization mode dispersion means the time difference between two signal components traveling along two polarization axes orthogonal to each other generated according to the polarization characteristics of the optical fiber or the optical device. Since such polarization mode dispersion is sensitive to environmental variations such as temperature and external pressure, it may vary with time.

Further, the non-linear birefringence is a birefringence occurring due to a change in the refractive index of the optical fiber according to the intensity of the optical signal. When a plurality of optical signals is simultaneously transmitted through one optical fiber, the non-linear birefringence rapidly changes the polarization states of the adjacent channels. Since the change of polarization varies depending on the polarization states between the channels, the resultant effects of the non-linear birefringence also varies with time.

Furthermore, in a conventional OSNR monitoring method employing only the polarization nulling method, an unpredictable error tends to occur due to the polarization mode dispersion and the non-linear birefringence. In other words, an optical signal with a polarization component orthogonal to the polarization state of the linear polarizer 13 is not completely removed when passing through the linear polarizer 13. It is because that the polarization nulling ratio of the linear polarizer 13 is finite (i.e. not ideal) and the optical fiber causes polarization mode dispersion and non-linear birefringence of the optical signals. However, since the conventional OSNR monitoring method does not consider these problems, the accuracy of OSNR measurement is lowered.

In addition, the conventional OSNR monitoring method employing only the polarization nulling method should have the waveguide diffraction grating 11 for demultiplexing of WDM optical signals and an OSNR monitoring apparatus for each of demultiplexed optical signals. Therefore, the cost of the equipment becomes high.

Disclosure of Invention

The present invention is conceived to solve the aforementioned problems. An object of the present invention is to provide a method and apparatus for monitoring optical signal to noise ratio (OSNR) of a wavelength division multiplexing (WDM) optical transmission system using polarization nulling method and a tunable optical bandpass filter for changing a center wavelength of an optical band.

Another object of the present invention is to provide an OSNR monitoring method and apparatus capable of more accurately measuring the OSNR, which can consider the finite polarization nulling ratio, polarization mode dispersion and the non-linear birefringence of an optical system in real time.

According to an aspect of the present invention for achieving the objects, there is provided an apparatus for monitoring optical signal to noise ratio (OSNR) of wavelength division multiplexed optical signals having center wavelengths of $\lambda_1, \ldots, \lambda_i, \ldots, \lambda_n$ (i=1,2, \ldots ,n), comprising a polarization controller for controlling polarization states of the wavelength division multiplexed optical signals; a tunable optical bandpass filter for varying its center wavelength $\lambda_v$ and filtering an optical signal having a center wavelength of $\lambda_i$ for which the OSNR is to be measured among the wavelength division multiplexed optical signals; an optical signal separating means for separating the filtered optical signal into a first optical signal and a second optical signal; a linear polarizer for linearly polarizing the second optical signal; and an OSNR measuring means for calculating the OSNR by measuring the powers of the first optical signal and the second optical signal that has passed through the linear polarizer.

When $\lambda_v$ conforms to $\lambda_i$, the OSNR measuring means obtains power $P_1$ which is the power of the first optical signal and power $P_2$ which is the minimum power of the second optical signal passing through the linear polarizer while controlling actively the polarization state with the polarization controller. When $\lambda_v$ is shifted from $\lambda_i$ by a predetermined distance, the OSNR measuring means obtains power $P_3$ which is the power of the first optical signal and power $P_4$ which is the minimum power of the second optical signal passing through the linear polarizer while controlling actively the polarization state with the polarization controller. Then, the OSNR measuring means calculates the OSNR using the measured powers of $P_1$, $P_2$, $P_3$ and $P_4$. At this time, when a polarization state of an optical signal that has passed through the polarization controller is orthogonal to a polarization state of the linear polarizer, the power of the second optical signal that has passed through the linear polarizer is minimized. The distance of the band shift by which $\lambda_v$, the center wavelength of the tunable optical bandpass filter, is shifted from $\lambda_i$ is determined so that at least a portion of the optical signal with a center wavelength of $\lambda_i$ can be measured by the tunable optical bandpass filter.

Preferably, the OSNR monitoring apparatus further comprises a polarization control signal generator for generating a predetermined polarization control signal so that the polarization controller may control the polarization state of the optical signal.

It is preferred that the OSNR monitoring apparatus further comprise a wavelength control signal generator for generating a predetermined wavelength control signal so that the center wavelength $\lambda_v$ of the tunable optical bandpass filter may vary within a range from $\lambda_1$ to $\lambda_n$.

According to another aspect of the present invention, there is provided an apparatus for monitoring optical signal to noise ratio (OSNR) of wavelength division multiplexed optical signals having center wavelengths of $\lambda_1, \ldots, \lambda_i, \ldots, \lambda_n$ (i=1,2, \ldots ,n), comprising a polarization controller for controlling polarization states of the wavelength division multiplexed optical signals; a tunable optical bandpass filter for varying its center wavelength $\lambda_v$ and filtering an optical signal having a center wavelength of $\lambda_i$ for which the OSNR is to be measured among the wavelength division multiplexed optical signals; a polarization beam splitter for separating the filtered optical signal into two optical signals of which polarization states are orthogonal to each other; and an OSNR measuring means for calculating the OSNR using power of the two optical signals of which the polarization states are orthogonal to each other.

When $\lambda_v$ conforms to $\lambda_i$, The OSNR measuring means obtains power $P_1$ of an optical signal having a polarization component conforming to the polarization state of the polarization controller and power $P_2$ of the optical signal having a polarization component orthogonal to the polarization state of the polarization controller by controlling the polarization state of optical signal using the polarization controller. When $\lambda_v$ is shifted from $\lambda_i$ by a predetermined distance, the OSNR measuring means obtains power $P_3$ of the optical signal having the polarization component conforming to the polarization state of the polarization controller and power $P_4$ of the optical signal having the polarization component orthogonal to the polarization state of the polarization controller by controlling the polarization state of optical signal using the polarization controller. Further, the OSNR measuring means calculates the OSNR using the measured powers of $P_1$, $P_2$, $P_3$ and $P_4$. The predetermined distance by which $\lambda_v$ is shifted from $\lambda_i$ is determined so that at least a portion of the optical signal having a center wavelength of $\lambda_i$ can be measured by the tunable optical bandpass filter having a center wavelength of $\lambda_v$.

The OSNR monitoring apparatus preferably further comprises a polarization control signal generator unit to generate a certain polarization control signal so that the polarization controller can control the polarization state of the optical signal.

It is preferred that the OSNR monitoring apparatus further comprise a wavelength control signal generator unit to generate a certain wavelength control signal so that the center wavelength $\lambda_v$ of the tunable optical bandpass filter can be varied within a range from $\lambda_1$ to $\lambda_n$

BEST MODE FOR CARRYING OUT THE INVENTION

Figure 1:
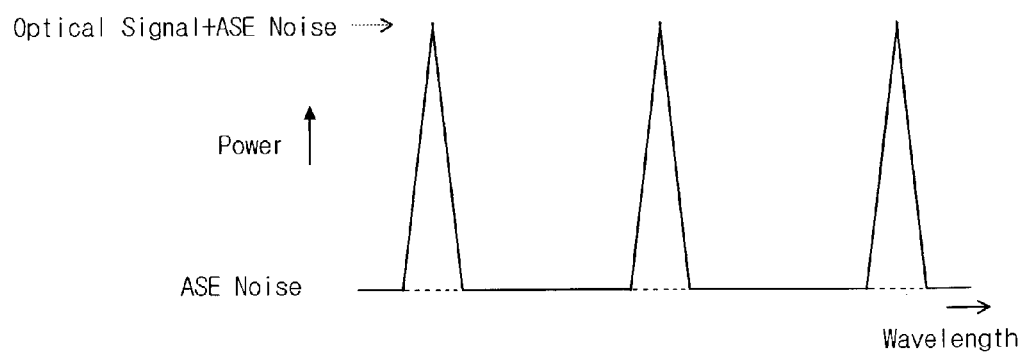
FIG. 1 is a view showing an ASE noise in an optical signal band obtained by a conventional linear interpolation method.
Figure 2:
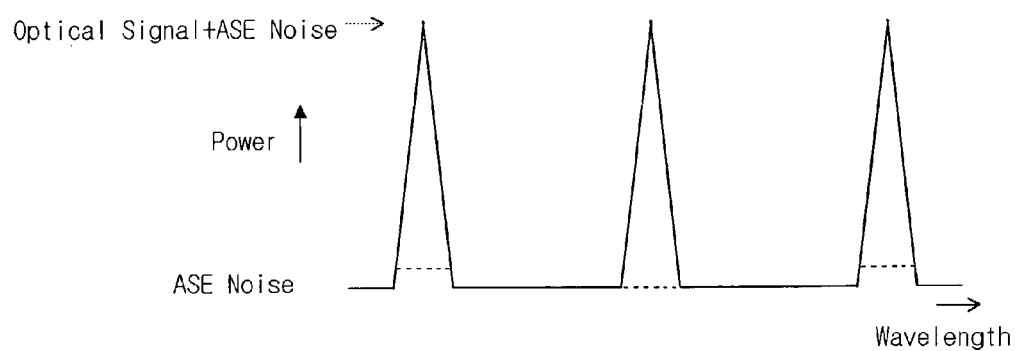
FIG. 2 is a view showing an example of an ASE noise included in each optical signal band that has passed through different paths and different numbers of erbium-doped fiber amplifiers.
Figure 3:
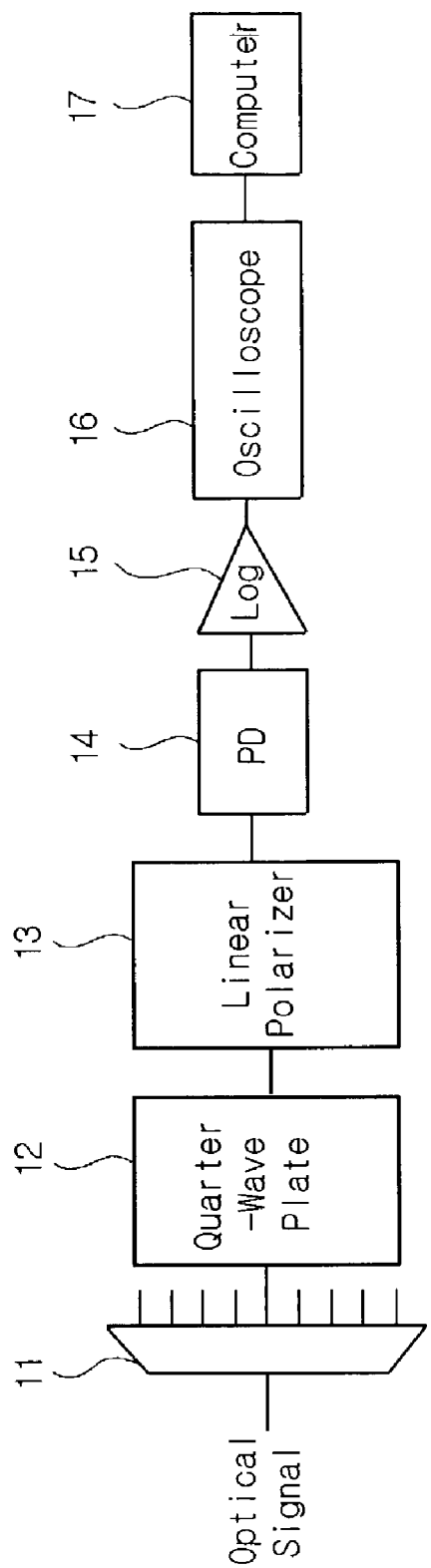
FIG. 3 is a view showing a configuration of a conventional optical signal to noise ratio (OSNR) monitoring apparatus using polarization nulling method.

Hereinafter, the constitutions and operations of preferred embodiments of the present invention will be described in detail with reference to the accompanying drawings, in which like reference numerals are used to indicate the same elements.

Figure 4:
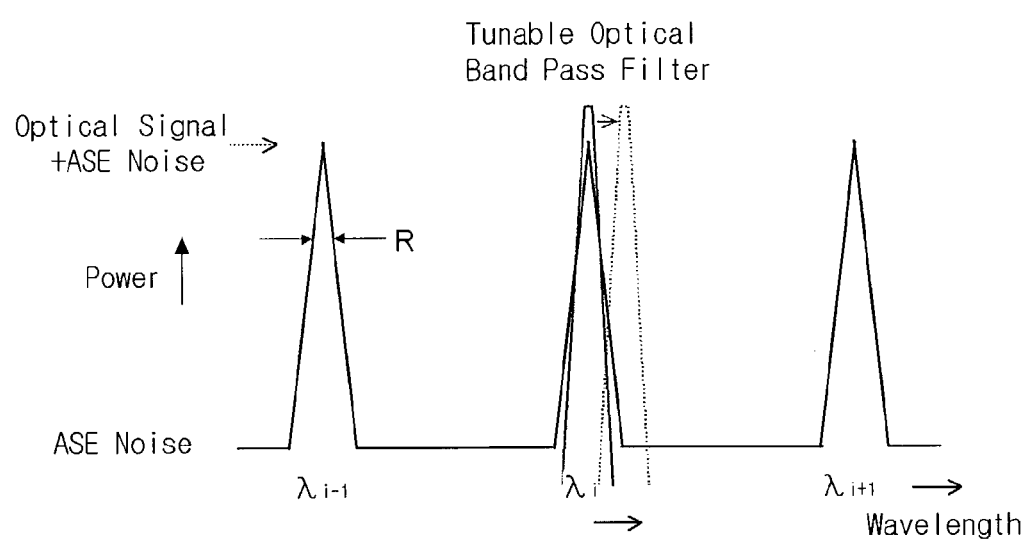
FIG. 4 is a view illustrating the principle of the OSNR monitoring method according to the present invention.
Figure 5:
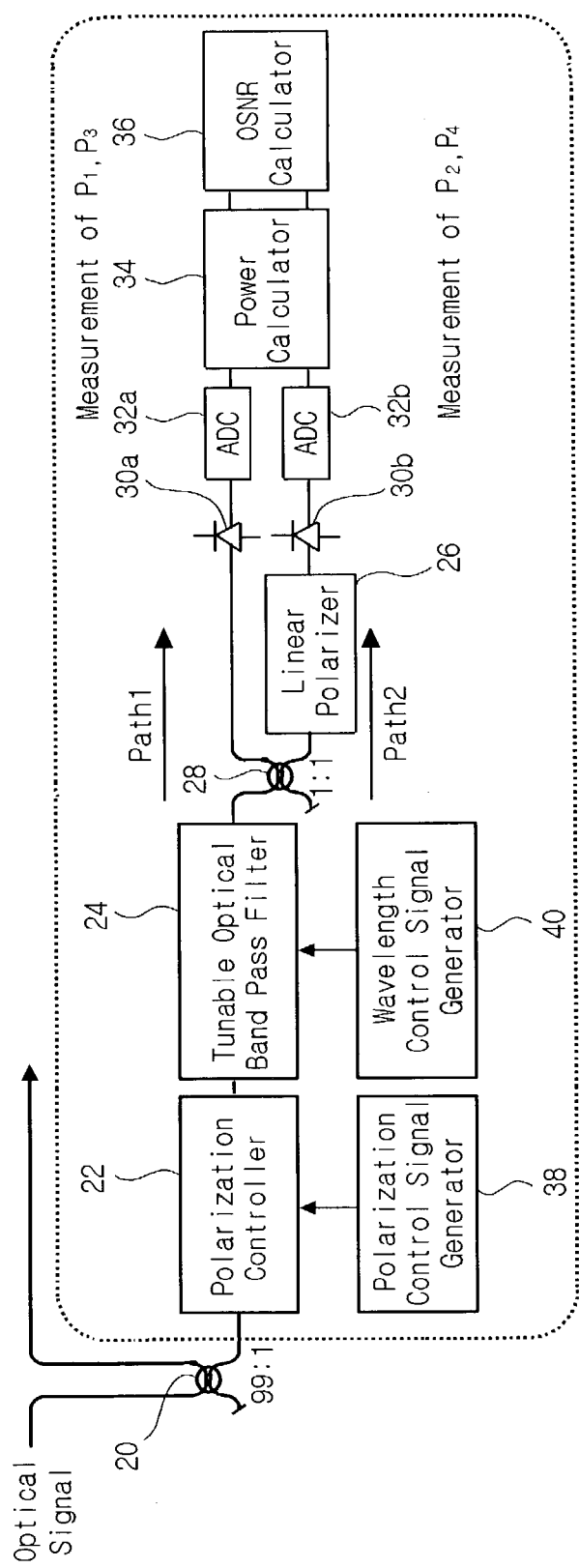
FIG. 5 is a view showing a first embodiment of the OSNR monitoring apparatus according to the present invention.

FIG. 4 illustrates the principle of an optical signal to noise ratio (OSNR) monitoring method according to the present invention, and FIG. 5 shows a first embodiment of an OSNR monitoring apparatus according to the present invention.

A portion of an optical signal traveling through a wavelength division multiplexing (WDM) optical communication network and including an amplified spontaneous emission (ASE) noise is separated by a 99:1 directional coupler 20 and then used for measuring an OSNR. The 99:1 directional coupler 20 extracts a portion of the optical signal, which has a 1/100 intensity of the optical signal including the ASE noise, and then inputs the extracted portion of the optical signal into a polarization controller 22.

The polarization controller 22 receives a polarization control signal from a polarization control signal generator 38 and adjusts the polarization state of the optical signal so that the intensity of the optical signal including the ASE noise being output from the linear polarizer 26 is minimized. Further, the polarization controller 22 performs a polarization nulling method. According to the polarization nulling, an optical signal having a polarization state orthogonal to a polarization state of the linear polarizer 26 is blocked while it passes through the linear polarizer 26. When the polarization state of the optical signal that has been linearly polarized by the polarization controller 22 is orthogonal to the polarization state of the linear polarizer 26, the intensity of the optical signal including ASE noise being output from the linear polarizer 26 is minimized.

At this time, the optical signal is linearly polarized while passing through the polarization controller 22, whereas the ASE noise distributed over a broad spectrum is not polarized when it passes through the polarization controller 22. The intensity of the optical signal and the intensity of ASE noise are not changed when they pass through the polarization controller 22.

Further, the linearly polarized optical signal should be completely blocked while passing through the linear polarizer 26 when the polarization state of the optical signal is exactly orthogonal to that of the linear polarizer 26. As described above, however, the linearly polarized optical signal is not completely extinguished due to the finite polarization nulling ratio of the linear polarizer 26, the polarization mode dispersion and non-linear birefringence of the optical fiber. Linearly polarized component of ASE noise remains while it passes through the linear polarizer 26, and its power is reduced to a half.

The linear polarizer 26 may be an optical fiber-based optical device and constructed to have a fixed polarization state. It is thus possible to make the polarization state of the optical signal orthogonal to the polarization state of the linear polarizer 26 by controlling the polarization controller 22. The polarization controller 22 may be implemented by utilizing an optical fiber and a piezoelectric device. Those skilled in the art will understand that the linear polarizer 26 and the polarization controller 22 are not limited thereto but may be implemented using a variety of devices.

The optical signal including ASE noise that has passed through the polarization controller 22 is input to a tunable optical bandpass filter 24. The pass band of the tunable optical bandpass filter 24 is adapted to pass only one optical signal channel without affecting adjacent channels, as shown in FIG. 4. The tunable optical bandpass filter 24 receives wavelength control signal from the wavelength control signal generator 40 to shift the center wavelength $\lambda_v$ of the pass band. At this time, the tunable optical bandpass filter 24 can be controlled to filter out all wavelengths of the wavelength division multiplexed signals according to the wavelength control signal from the wavelength control signal generator 40. Therefore, the present invention can measure the OSNR of the wavelength division multiplexed signals without using a demultiplexer such as a waveguide diffraction grating.

Further, the tunable optical bandpass filter 24 can be controlled to filter an optical signal with a shift of a predetermined distance from a center wavelength $\lambda_i$ of the optical signal for which the OSNR will be measured, according to the wavelength control signal from the wavelength control signal generator 40, as shown in FIG. 4. A half symmetric cavity resonator constructed as a micro-electromechanical system (MEMS), a Fabry-Perot tunable filter, an integrated optical device including a grating, a multi-layer thin film device, an acoustic optical filter, or the like may be used as the tunable optical bandpass filter 24. To achieve the OSNR measurement accuracy, it is preferable to use a narrow-band tunable optical filter having a pass band narrower than that of the optical signal and this filter is better to be fabricated using a half symmetric cavity resonator based on MEMS.

The principle of the OSNR monitoring method according to the present invention will be described. The center wavelength $\lambda_v$ of the tunable optical bandpass filter 24 is controlled to conform to the center wavelength $\lambda_i$ of the optical signal of which the OSNR is to be measured, according to the wavelength control signal provided by the wavelength control signal generator 40. The optical signal extracted by the 99:1 directional coupler 20 passes through the polarization controller 22 and the tunable optical bandpass filter 24. The signal is then separated into a first and a second optical signal by the 1:1 directional coupler 28. The first optical signal includes ASE noise, and is subjected to optoelectric-conversion by a photo detector 30a and then converted into a digital signal by an analog-to-digital converter 32a along path 1. Subsequently, a power calculator 34 calculates power $P_1$ of the first optical signal including ASE noise.

Thereafter, maintaining a state where the center wavelength $\lambda_v$ of the tunable optical bandpass filter 24 conforms to the center wavelength $\lambda_i$ of the optical signal, the polarization state of the optical signal passing through the polarization controller 22 is adjusted according to the polarization control signal from the polarization control signal generator

38. Along path 2, the second optical signal separated by the 1:1 directional coupler 28, which contains ASE noise, passes though a linear polarizer 26 and is subjected to optoelectric conversion by a photo detector 30b. It is then converted into a digital signal by an analog-to-digital converter 32b. Subsequently, the power calculator 34 calculates the power of the second optical signal including linearly polarized ASE noise.

The polarization state of the polarization controller 22 is scanned within a predetermined range and the minimum value among the calculated signal powers is searched for. As described above, when the polarization state of the optical signal passing through the polarization controller 22 is orthogonal to the polarization state of the linear polarizer 26, the power of the optical signal including ASE noise calculated in the power calculator 34 is minimized. This power $P_2$ of the optical signal at this time including ASE noise is obtained.

Then, as shown in FIG. 4, the center wavelength $\lambda_v$ of the tunable optical bandpass filter 24 is shifted by a certain distance from the center wavelength $\lambda_i$ of the optical signal by the wavelength control signal from the wavelength control signal generator 40. The wavelength shift distance is determined so that the tunable optical bandpass filter 24 may pass at least a portion of the optical signal for which the OSNR is to be measured. To achieve the OSNR measurement accuracy, it is preferred that when a transmission rate of the optical signal is R Gbps, the distance be about 0.3~3R GHz. For example, when the transmission rate of the optical signal is 10 Gbps, the center wavelength $\lambda_v$ of the tunable optical bandpass filter 24 is adjusted to be shifted by 3~30 GHz from the center wavelength $\lambda_i$ of the optical signal. The center wavelength $\lambda_v$ of the tunable optical bandpass filter 24 may be adjusted to be shifted by a predetermined distance either to the right or to the left of the center wavelength $\lambda_i$ of the optical signal, according to the wavelength control signal provided by the wavelength control signal generator 40.

If the pass band of the tunable optical bandpass filter 24 is shifted, the measured intensity of the optical signal becomes smaller than the intensity measured before the pass band shift due to the transmission characteristic of the optical bandpass filter 24. However, since the ASE noise is evenly distributed over a broad spectrum, the intensity of the ASE noise has a substantially constant value. Along path 1, the first optical signal including the ASE noise and separated by the 1:1 directional coupler 28 is subjected to optoelectric conversion by the photo detector 30a and then converted into a digital signal by the analog-to-digital converter 32a. The power calculator 34 calculates power $P_3$ of the first optical signal including the ASE noise.

Thereafter, maintaining a state where the center wavelength $\lambda_v$ of the tunable optical bandpass filter 24 is shifted by a predetermined distance from the center wavelength $\lambda_i$ of the optical signal, the polarization state of the optical signal passing through the polarization controller 22 is adjusted according to the polarization control signal provided by the polarization control signal generator 38. Along path 2, the second optical signal including ASE noise and separated by the 1:1 directional coupler 28 is subjected to optoelectric conversion by the photo detector 30b after passing through the linear polarizer 26. Then it is converted into the digital signal by the analog-to-digital converter 32b. The power calculator 34 calculates the power of the second optical signal including the linearly polarized ASE noise.

The polarization state of the polarization controller 22 is scanned within a predetermined range in order to obtain the minimum value among the calculated powers. As described above, when the polarization state of the optical signal passing through the polarization controller 22 is orthogonal to the polarization state of the linear polarizer 26, the power of the optical signal including ASE noise calculated in the power calculator 34 is minimized. This power $P_4$ of the optical signal at this time including ASE noise is obtained.

The aforementioned power $P_1$, $P_2$, $P_3$ and $P_4$ can be expressed by the following equations:

$$P_1 = P_{S1}(1-\epsilon) + S_{ASE}B_0,$$

$$P_2 = P_{S1}\epsilon + 0.5 S_{ASE}B_0,$$

$$P_3 = P_{S2}(1-\epsilon) + S_{ASE}B_0,$$

$$P_4 = P_{S2}\epsilon + 0.5 S_{ASE}B_0, \qquad (1)$$

where $P_{S1}$ is the intensity (watt) of the optical signal that has passed through the tunable optical bandpass filter 24 when $\lambda_v$ is equal to $\lambda_i$ and that does not include the intensity of the ASE noise; $P_{S2}$ is the intensity (watt) of the optical signal that has passed through the tunable optical bandpass filter 24 when $\lambda_v$ is shifted from $\lambda_i$ by a predetermined distance and that does not include the intensity of the ASE noise; $S_{ASE}$ is the power density (watt/nm) of the ASE noise; $B_0$ is the bandwidth (nm) of the tunable optical bandpass filter 24, and $\epsilon$ is the polarization nulling ratio of the linear polarizer 26.

Therefore, $S_{ASE}B_0$ indicates the power of the ASE noise that has passed through the tunable optical bandpass filter 24. $P_{S1}\epsilon$ and $P_{S2}\epsilon$ indicate the intensity of the optical signal, which are still measured when the polarization state of the optical signal that has passed through the polarization controller 22 is orthogonal to the polarization state of the linear polarizer 26 due to the finite polarization nulling ratio. In an ideal case, i.e. $\epsilon=0$, the photo detector 30b will measure only the ASE noise for $P_2$ and $P_4$. The reason why the intensity of the ASE noise in $P_2$ and $P_4$ is a half as large as that of the ASE noise in $P_1$ and $P_3$ is that the power of the ASE noise in $P_2$ and $P_4$ is reduced to a half after passing through the linear polarizer 26 along path 2.

From Equation 1, $\epsilon$, $P_{S1}$, $S_{ASE}$ and OSNR can be obtained as follows:

$$\varepsilon = \frac{(P_2 - P_4)}{(P_1 - P_3 + P_2 - P_4)}, \qquad (2)$$

$$P_{S1} = \frac{(P_1 - 2P_2)}{(1 - 3\varepsilon)},$$

$$S_{ASE} = \frac{2(P_2 - P_{S1}\varepsilon)}{B_0},$$

$$OSNR = \frac{P_{S1}}{S_{ASE}B_r} = \frac{(P_1 - 2P_2)}{2(1 - 3\varepsilon)(P_2 - P_{S1})} \frac{B_0}{B_r},$$

where $B_r$ (nm) is a resolution, which is a reference bandwidth used to determine the power of the ASE noise for calculating the OSNR. The OSNR calculator 36 calculates the OSNR from $P_1$, $P_2$, $P_3$ and $P_4$ calculated in the power calculator 34 by using Equations 2.

Meanwhile, the value of $\epsilon$ may be determined by the polarization mode dispersion and non-linear birefringence of the optical transmission system in addition to the inherent finite polarization nulling ratio of the linear polarizer 26. Since the polarization state is changed with time depending on the polarization mode dispersion and non-linear birefringence, the value of $\epsilon$ may also be continuously changed with time. The present invention can improve the measurement accuracy of the OSNR by considering the influence of time variation of the value of $\epsilon$ on the OSNR in real time using Equation 2.

In order to more accurately measure the OSNR, it is necessary to measure $P_2$ and $P_4$ after the polarization controller 22 is adjusted so that the value of $\epsilon$ is minimized. This means that the intensity of the optical signal after passing through the linear polarizer 26 with a finite (i.e. a non-ideal) polarization nulling ratio should be minimized. In other words, the intensity of the ASE noise and the OSNR can be more accurately measured by adjusting the polarization controller 22 so that the values ($P_{S1}\epsilon$, $P_{S2}\epsilon$) of optical signal components included in $P_2$ and $P_4$ are smaller than or similar to the intensity ($0.5S_{AES}B_0$) of amplified natural emission optical noise.

Although it has been described in the first embodiment that the powers of $P_1$, $P_2$, $P_3$ and $P_4$ of the optical signal is measured in this order when measuring the OSNR, those skilled in the art will understand that the order is not limited thereto. Since the method of measuring the power of the optical signal is the same as the first embodiment except for measurement order, the detailed explanation of the method will be omitted.

Figure 6:
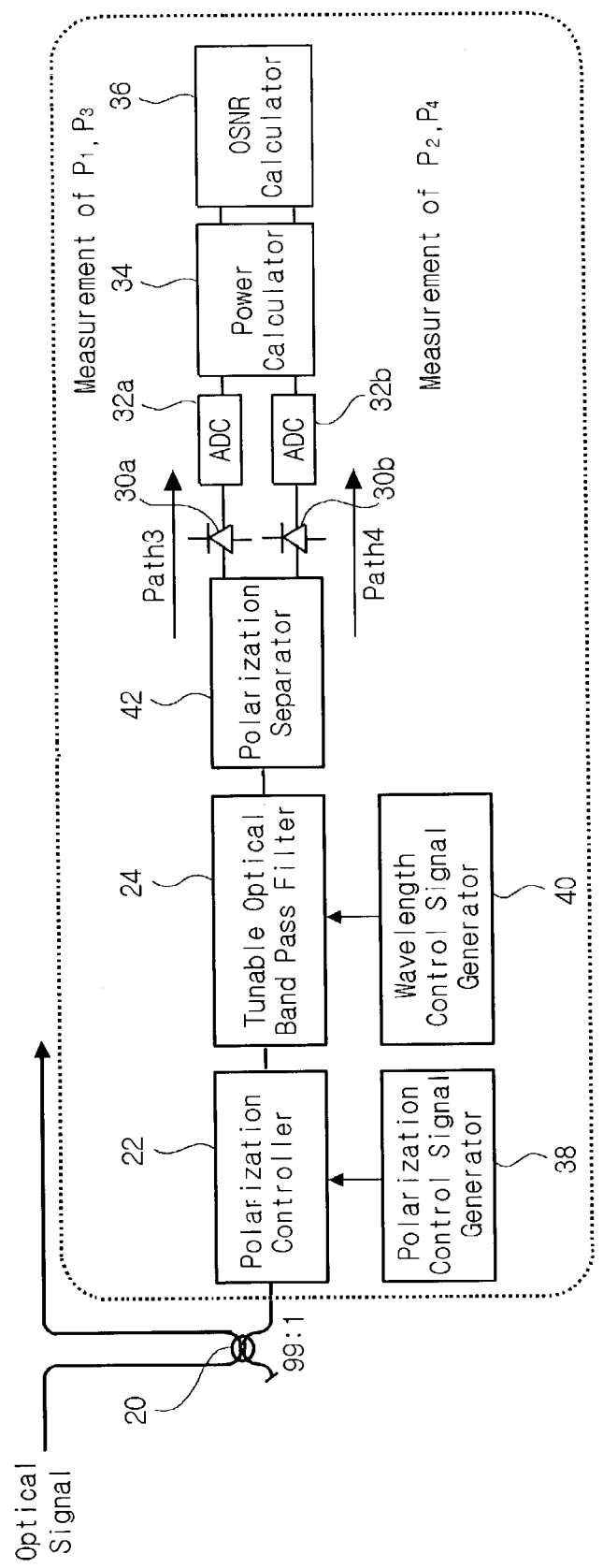
FIG. 6 is a view showing a second embodiment of the OSNR monitoring apparatus according to the present invention.

FIG. 6 is a view showing a second embodiment of the OSNR monitoring apparatus according to the present invention.

The 99:1 directional coupler 20 extracts a portion of the optical signal, which is 1/100 times as large as the intensity of the optical signal including the ASE noise, and then inputs the extracted portion of the optical signal into the polarization controller 22.

The polarization controller 22 receives polarization control signal from the polarization control signal generator 38 and operates so that the optical signal being output from the polarization beam splitter 42 is separated into two optical signals with polarization components that are orthogonal to each other. That is, an optical signal having a polarization state identical to the polarization state of the polarization controller 22 proceeds along path 3. An optical signal having a polarization state orthogonal to the polarization state of the polarization controller 22 proceeds along path 4.

Generally, it is required that, among the optical signals passing through the polarization beam splitter, optical signal components orthogonal to the polarization state of an optical signal passing through the polarization controller should be completely removed. However, they are not completely removed due to the finite polarization nulling ratio of the polarization beam splitter and the polarization mode dispersion and the non-linear birefringence. Further, linearly polarized component of ASE noise remains after passing through the polarization beam splitter and the power of the ASE noise is reduced to a half.

The optical signal including ASE noise that has passed through the polarization controller 22 is then input into the tunable optical bandpass filter 24. Since the constitution and operating characteristic of the tunable optical bandpass filter 24 are the same as those of the first embodiment described with reference to FIG. 5, the detailed description thereof will be omitted.

The principle of the OSNR monitoring method according to the present invention will be explained with reference to FIGS. 4 and 6. The center wavelength $\lambda_v$ of the tunable optical bandpass filter 24 is adjusted to conform to the center wavelength $\lambda_i$ of an optical signal for which the OSNR is to be measured, according to the wavelength control signal provided by the wavelength control signal generator 40.

Then, the polarization state of the optical signal passing through the polarization controller 22 is adjusted according to the polarization control signal provided by the polarization control signal generator 38.

Along path 3, the optical signal having a polarization component conforming to the polarization state of the polarization controller 22 is subjected to a optoelectric conversion by the photo detector 30a with the ASE noise and then converted into digital signal by the analog-to-digital converter 32a. The power calculator 34 calculates the power $P_1$ of the optical signal including the linearly polarized ASE noise.

Along path 4, the optical signal with the polarization component orthogonal to the polarization state of the polarization controller 22 is subjected to the optoelectric conversion by the photo detector 30b and then converted into the digital signal by the analog-to-digital converter 32b. The power calculator 34 calculates power $P_2$ of the optical signal including the linearly polarized ASE noise. The polarization state of the polarization controller 22 is scanned within a predetermined range in order to obtain the minimum value among the power of the optical signals detected by the photo detector 30b. When an optical signal having a polarization component orthogonal to the polarization state of the polarization controller 22 is detected in path 4, the power of the optical signal including ASE noise calculated in the power calculator 34 is minimized. At this time, the power $P_2$ of the optical signal including ASE noise is detected. Since the optical signal is separated into the two optical signals having polarization components orthogonal to each other by the polarization beam splitter 42, $P_1$ and $P_2$ are measured simultaneously.

Then, as shown in FIG. 4, the center wavelength $\lambda_v$ of the tunable optical bandpass filter 24 is shifted by a predetermined distance from the center wavelength $\lambda_i$ of the optical signal according to the wavelength control signal provided by the wavelength control signal generator 40. The predetermined distance is determined so that the tunable optical bandpass filter 24 pass at least a portion of the optical signal for which the OSNR is to be measured, as explained with respect to the first embodiment. Further, in view of the accuracy of the OSNR measurement, it is preferred that when the transmission rate of the optical signal is R Gbps, the shift distance be in the range of 0.3~3R GHz.

Thereafter, the polarization state of the optical signal passing through the polarization controller 22 is adjusted according to the polarization control signal provided by the polarization control signal generator 38. Along path 3, the optical signal having a polarization component conforming to the polarization state of the polarization controller 22 is subjected to the optoelectric conversion by the photo detector 30a together with ASE noise and then converted into the digital signal by the analog-to-digital converter 32a. The power calculator 34 calculates the power $P_3$ of the optical signal including the linearly polarized ASE noise.

Along path 4, the optical signal having a polarization component orthogonal to the polarization state of the polarization controller 22 is subjected to optoelectric conversion by the photo detector 30b and then converted into a digital signal by the analog-to-digital converter 32b. The power calculator 34 calculates power $P_4$ of the optical signal including the linearly polarized ASE noise. The polarization state of the polarization controller 22 is scanned within a predetermined range in order to obtain the minimum value among the optical signal powers detected by the photo detector 30b. When an optical signal with the polarization component orthogonal to the polarization state of the polarization controller 22 is detected in path 4, the power of the optical signal including linearly polarized ASE noise calculated in the power calculator 34 is minimized. At this time, the power $P_4$ of the optical signal including the linearly polarized ASE noise is detected. Since the optical signal is separated into the two optical signals with polarization components orthogonal to each other by means of the polarization beam splitter 42, $P_3$ and $P_4$ are measured simultaneously.

The aforementioned powers $P_1$, $P_2$, $P_3$ and $P_4$ can be expressed by the following equations:

$$P_1 = P_{S1}(1-\epsilon) + 0.5 S_{ASE} B_0,$$

$$P_2 = P_{S1}\epsilon + 0.5 S_{ASE} B_0,$$

$$P_3 = P_{S2}(1-\epsilon) + 0.5 S_{ASE} B_0,$$

$$P_4 = P_{S2}\epsilon + 0.5 S_{ASE} B_0, \qquad (3)$$

where definitions of $P_{S1}$, $P_{S2}$, $S_{ASE}$ and $B_0$ are the same as defined with respect to Equations 1 except that $\epsilon$ represents the polarization nulling ratio of the polarization beam splitter 42.

In Equations 3, contrary to Equations 1, the optical signal including ASE noise passes through the polarization beam splitter 42 when measuring $P_1$ and $P_3$. Thus, only the linearly polarized component of the ASE noise is detected and the power of the ASE noise is reduced to a half.

$\epsilon$, $P_{S1}$, $S_{ASE}$ and OSNR can be obtained from Equations 3 as follows:

$$\varepsilon = \frac{(P_2 - P_4)}{(P_1 - P_3 + P_2 - P_4)}, \qquad (4)$$

$$P_{S1} = \frac{(P_1 - P_2)}{(1 - 2\varepsilon)},$$

$$S_{ASE} = \frac{2(P_2 - P_{S1}\varepsilon)}{B_0},$$

$$OSNR = \frac{P_{S1}}{S_{ASE} B_r} = \frac{(P_1 - P_2)}{2(1 - 2\varepsilon)(P_2 - P_{S1})} \frac{B_0}{B_r},$$

where $B_r$ (nm) is a resolution, which is a reference bandwidth used to determine the power of the ASE noise for calculating the OSNR.

The OSNR calculator 36 calculates the OSNR from $P_1$, $P_2$, $P_3$ and $P_4$ calculated in the power calculator 34 using Equations 4.

Figure 7:
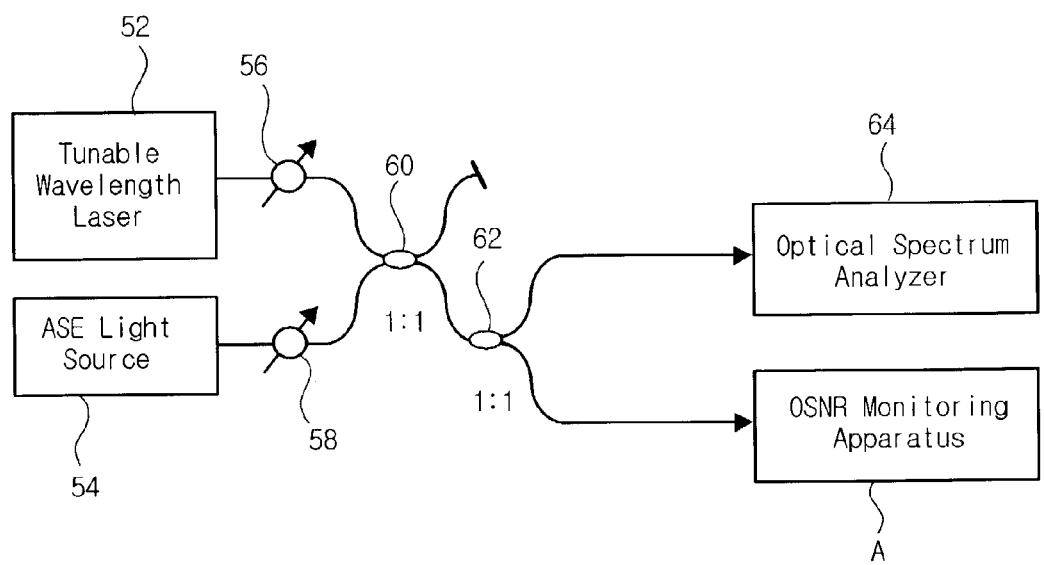
FIG. 7 is a view showing an experimental setup for demonstrating effectiveness of the OSNR monitoring apparatus according to the present invention.

FIG. 7 shows an experimental setup for demonstrating effectiveness of the OSNR monitoring apparatus according to the present invention. An optical signal is supplied from a tunable wavelength laser 52 and an ASE noise is supplied from an ASE light source 54 using an erbium-doped fiber amplifier. The optical signal and the ASE noise are coupled by a 1:1 directional coupler 60, and then, the coupled optical signal and the ASE noise are again separated into two components by a 1:1 directional coupler 62.

One of the two components enters into an optical spectrum analyzer 64, which measures an OSNR by linear interpolation method. At this time, since the optical signal band is narrow and the ASE noise band is very broad and even, it can be assumed that the OSNR measured by the linear interpolation method is exact. Meanwhile, the other of the two components enters into an OSNR monitoring apparatus A, which measures the OSNR according to the present invention. The OSNR is changed by increasing/decreasing the power of the optical signal and the intensity of the ASE noise using optical variable attenuators 56, 58 which are installed at the tunable wavelength laser 52 and the ASE light source 54, respectively.

Figure 8:
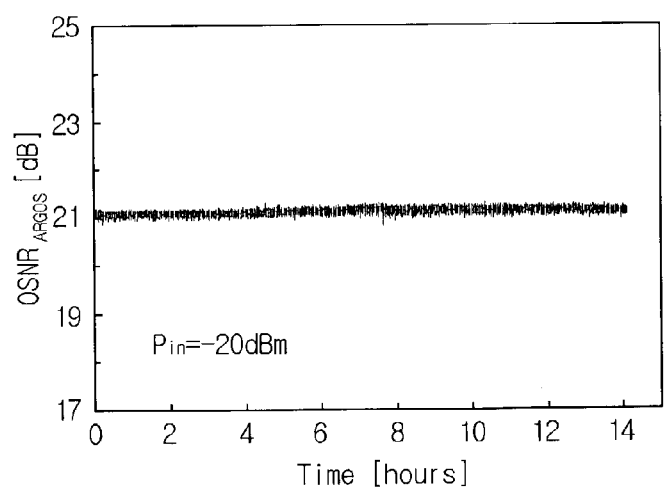
FIG. 8 is a graph showing the OSNR measured in accordance with the experimental setup shown in FIG. 7.

FIG. 8 is a graph showing the OSNR measured using the experimental setup shown in FIG. 7. In FIG. 8, an optical device using an optical fiber and a piezoelectric device is used as the polarization controller 22; a filter including MEMS based half symmetric cavity resonator is used as the tunable optical bandpass filter 24; and an optical device including an optical fiber is used as the linear polarizer 26. The optical signal is a 10 Gb/s NRZ (Non-Return-to-Zero) signal at wavelength of 1550 nm and an optical power of −20 dBm. The OSNR measured using an optical spectrum analyzer 64 is about 21 dB. It can be seen from the result that the OSNR measured according to the present invention falls within an error range of about ±0.2 dB as compared with the OSNR measured using the optical spectrum analyzer 64. The accuracy of the measurement is maintained even when the OSNR is measured for a long period over 14 hours.

Figure 9:
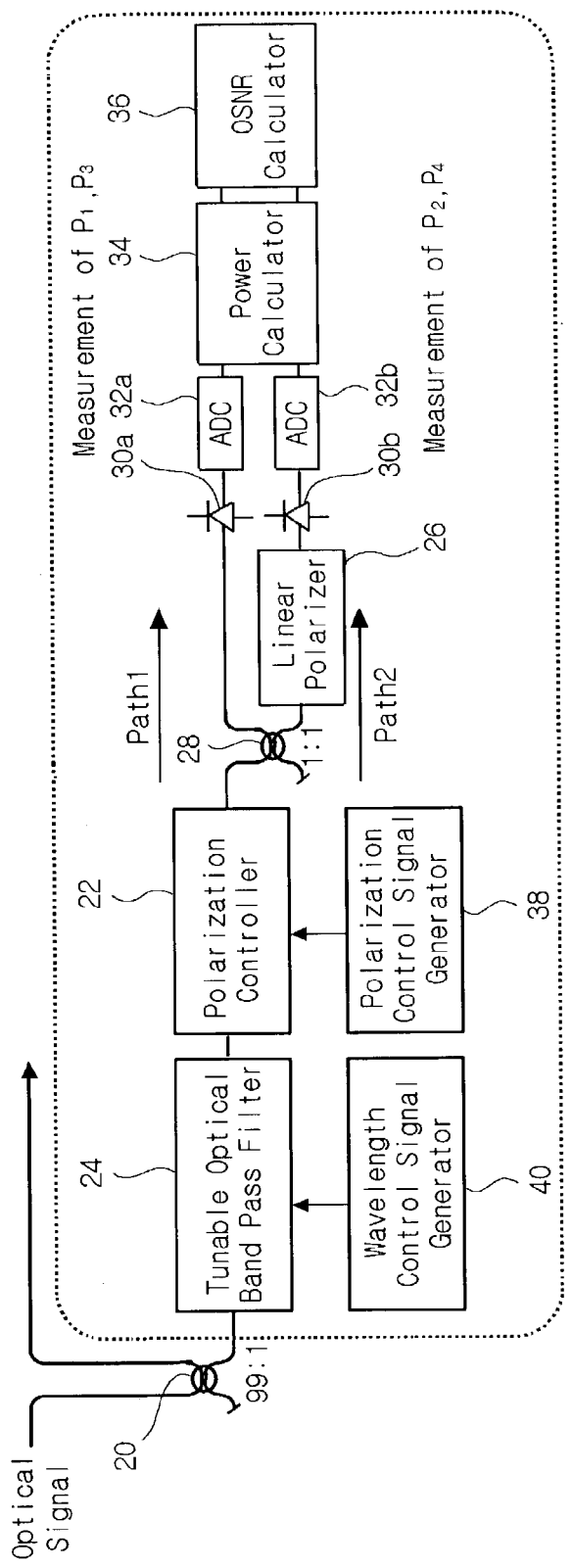
FIG. 9 is a view showing a third embodiment of the OSNR monitoring apparatus according to the present invention.
Figure 10:
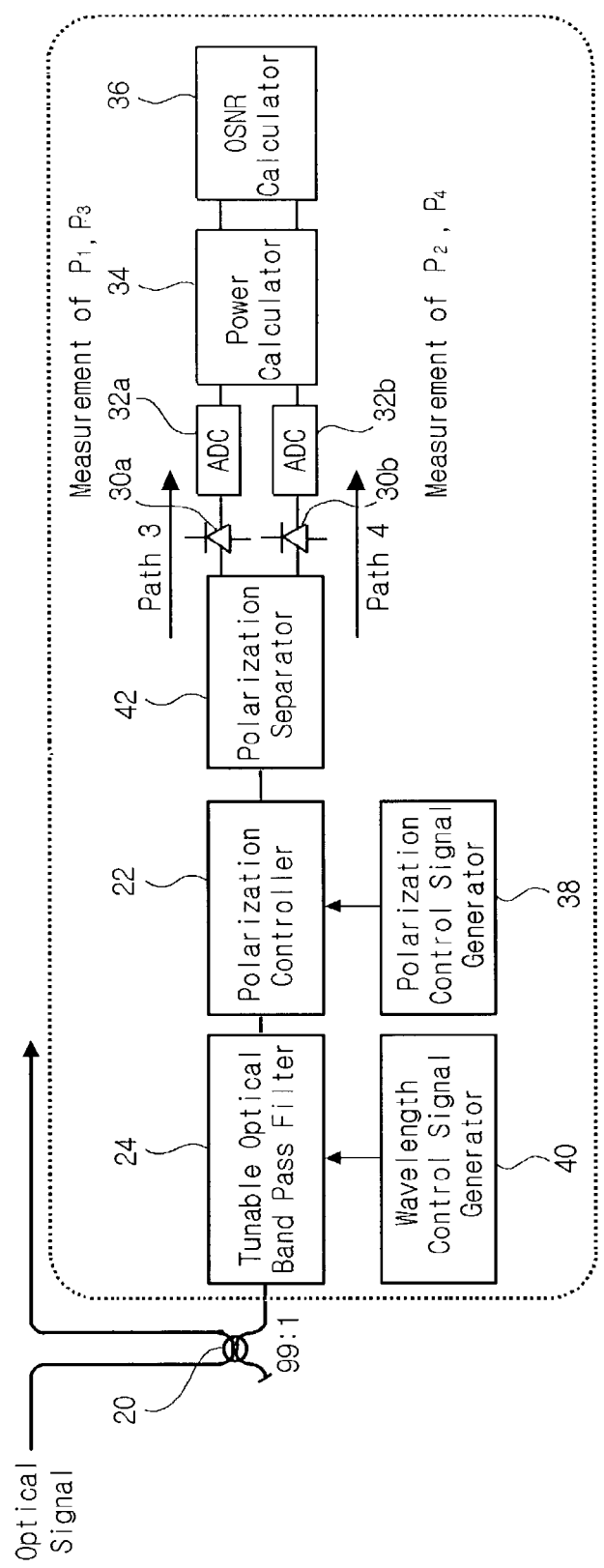
FIG. 10 is a view showing a fourth embodiment of the OSNR monitoring apparatus according to the present invention.

Those skilled in the art can make various substitutions, modifications and changes to the present invention without departing from the technical spirit of the invention. For example, as shown in FIG. 9, a third embodiment of the present invention may be implemented by changing the positions of the polarization controller 22 and the tunable optical bandpass filter 24 shown in FIG. 5. In the third embodiment, the OSNR can be obtained from Equations 1 and 2 in the same way as the first embodiment. Further, as shown in FIG. 10, a fourth embodiment of the present invention may be implemented by changing the positions of the polarization controller 22 and the tunable optical bandpass filter 24 shown in FIG. 6. Even in the fourth embodiment, the OSNR can be obtained from Equations 3 and 4 in the same way as the second embodiment.

Thus, it should be understood that the present invention is not limited to the embodiments and the accompanying drawings. It will be apparent that such modifications and the like are covered by the appended claims.

INDUSTRIAL APPLICABILITY

The present invention is the OSNR monitoring apparatus and method for use in a WDM optical networks. The invention accurately measures the OSNR of the WDM optical signals using a tunable optical bandpass filter and polarization nulling method by considering the effects of the finite polarization nulling ratio, polarization mode dispersion and non-linear birefringence of the system in real time. Further, according to the present invention, the tunable optical bandpass filter is scanned to filter all the wavelength bands of the wavelength division multiplexed signals. Therefore, the invention does not require a separate OSNR monitoring device for each of the demultiplexed optical signals. Thus, the invention has an advantage of reducing the cost of the systems.

The invention claimed is:

1. An apparatus for monitoring optical signal to noise ratio (OSNR) of wavelength division multiplexed optical signals having center wavelengths of $\lambda_1, \ldots, \lambda_i, \ldots, \lambda_n$, (i=1,2, . . . ,n) in a wavelength division multiplexing optical transmission system, comprising:
 a polarization controller for controlling polarization states of the wavelength division multiplexed optical signals;
 a tunable optical bandpass filter for varying its center wavelength $\lambda_v$ and filtering an optical signal having a center wavelength of $\lambda_i$ for which the OSNR is to be measured among the wavelength division multiplexed optical signals;

an optical signal separating means for separating the filtered optical signal into a first optical signal and a second optical signal;

a linear polarizer for linearly polarizing the second optical signal; and an OSNR measuring means for obtaining, when $\lambda_v$ conforms to $\lambda_i$, power ($P_1$) of the first optical signal and power ($P_2$) which is the minimum power of the second optical signal passing through the linear polarizer; and when $\lambda_v$ is shifted from $\lambda_i$ by a predetermined distance, power ($P_3$) of the first optical signal and power ($P_4$) which is the minimum power of the second optical signal passing through the linear polarizer; and obtaining the OSNR using the powers of $P_1$, $P_2$, $P_3$ and $P_4$, wherein the power of the second optical signal passing through the linear polarizer is minimized when a polarization state of the second optical signal is orthogonal to the polarization state of the linear polarizer and the powers of $P_2$ and $P_4$ are obtained while scanning the polarization state of the optical signal using the polarization controller.

2. The apparatus as claimed in claim 1, wherein when the optical signal has a transmission rate of R Gbps, and the predetermined distance by which $\lambda_v$ is shifted from $\lambda_i$ is 0.3~3R GHz.

3. The apparatus as claimed in claim 1, wherein the optical signal separating means is a 1:1 directional coupler.

4. The apparatus as claimed in claim 3, wherein the OSNR is obtained using the following equations:

$$\varepsilon = \frac{(P_2 - P_4)}{(P_1 - P_3 + P_2 - P_4)},$$

$$P_{SI} = \frac{(P_1 - 2P_2)}{(1 - 3\varepsilon)},$$

$$OSNR = \frac{(P_1 - 2P_2)}{2(1 - 3\varepsilon)(P_2 - P_{SI})} \frac{B_0}{B_r},$$

where $B_r$ (nm) is a resolution, which is a reference bandwidth used to determine the power of amplified spontaneous emission (ASE) noise for calculating the OSNR, and $B_0$ is a bandwidth (nm) of the tunable optical bandpass filter.

5. The apparatus as claimed in claim 1, wherein the tunable optical bandpass filter is a narrow-band filter having a bandwidth narrower than that of the optical signal of which the OSNR is to be measured.

6. The apparatus as claimed in claim 1, wherein the OSNR measuring means comprises:

a first photo detector for detecting the first optical signal and then converting it into an electrical signal;

a second photo detector for detecting the second optical signal that has passed through the linear polarizer and then converting it into an electrical signal;

a first analog-to-digital converter for converting the analog electrical signal of the first photo detector into a digital signal;

a second analog-to-digital converter for converting the analog electrical signal of the second photo detector into a digital signal;

a power calculator for calculating the powers of $P_1$, $P_2$, $P_3$ and $P_4$ using the converted digital signals; and an OSNR calculator for calculating the OSNR using the powers $P_1$, $P_2$, $P_3$ and $P_4$ calculated by the power calculator.

7. The apparatus as claimed in claim 1, further comprising a polarization control signal generator for generating a predetermined polarization control signal so that the polarization controller can control the polarization state of the optical signal.

8. The apparatus as claimed in claim 1, further comprising a wavelength control signal generator for generating a predetermined wavelength control signal so that the center wavelength $\lambda_v$ of the tunable optical bandpass filter can be varied within a range from $\lambda_1$ to $\lambda_n$.

9. The apparatus as claimed in claim 1, wherein the tunable optical bandpass filter includes a half symmetric cavity resonator constructed as a micro-electromechanical system (MEMS).

10. An apparatus for monitoring optical signal to noise ratio (OSNR) of wavelength division multiplexed optical signals having center wavelengths of $\lambda_1, \ldots, \lambda_i, \ldots, \lambda_n$ (i=1,2,...,n), comprising:

a polarization controller for controlling polarization states of the wavelength division multiplexed optical signals;

a tunable optical bandpass filter for varying its center wavelength $\lambda_v$ and filtering an optical signal having a center wavelength of $\lambda_i$ for which the OSNR is to be measured among the wavelength division multiplexed optical signals;

a polarization beam splitter for separating the filtered optical signal into two optical signals of which polarization states are orthogonal to each other; and an OSNR measuring means for obtaining, when $\lambda_v$ conforms to $\lambda_i$, power ($P_1$) of the first optical signal having a polarization state conforming to that of the polarization controller and power ($P_2$) of the second optical signal having a polarization state orthogonal to that of the polarization controller, and when $\lambda_v$ is shifted from $\lambda_i$ by a predetermined distance, power ($P_3$) of the first optical signal having a polarization state conforming to that of the polarization controller and power ($P_4$) of the second optical signal having a polarization state orthogonal to that of the polarization controller, and calculating the OSNR using the powers of $P_1$, $P_2$, $P_3$ and $P_4$.

11. The apparatus as claimed in claim 10, wherein when a transmission rate of the optical signal is R Gbps, the predetermined distance by which $\lambda_v$ is shifted from $\lambda_i$ is 0.3~3R GHz.

12. The apparatus as claimed in claim 10, wherein the OSNR is obtained using the following equations:

$$\varepsilon = \frac{(P_2 - P_4)}{(P_1 - P_3 + P_2 - P_4)},$$

$$P_{SI} = \frac{(P_1 - P_2)}{(1 - 2\varepsilon)},$$

$$OSNR = \frac{(P_1 - P_2)}{2(1 - 2\varepsilon)(P_2 - P_{SI})} \frac{B_0}{B_r},$$

where $B_r$ (nm) is a resolution, which is a reference bandwidth used to determine the power of amplified spontaneous emission (ASE) noise for calculating the OSNR, and $B_0$ is a bandwidth (nm) of the tunable optical bandpass filter.

13. The apparatus as claimed in claim 10, wherein the tunable optical bandpass filter is a narrow-band filter having a bandwidth narrower than that of the optical signal for which the OSNR will be measured.

14. The apparatus as claimed in claim 10, wherein the OSNR measuring means comprises:
- a first photo detector for detecting the first optical signal and then converting it into an electrical signal;
- a second photo detector for detecting the second optical signal and then converting it into an electrical signal;
- a first analog-to-digital converter for converting the analog electrical signal of the first photo detector into a digital signal;
- a second analog-to-digital converter for converting the analog electrical signal of the second photo detector into a digital signal;
- a power calculator for calculating the powers of $P_1$, $P_2$, $P_3$ and $P_4$ using the converted digital signals; and
- an OSNR calculator for calculating the OSNR using the powers of $P_1$, $P_2$, $P_3$ and $P_4$ calculated by the power calculator.

15. The apparatus as claimed in claim 10, further comprising a polarization control signal generator for generating a predetermined polarization control signal so that the polarization controller can control the polarization state of the optical signal.

16. The apparatus as claimed in claim 10, further comprising a wavelength control signal generator for generating a predetermined wavelength control signal so that the center wavelength $\lambda_v$ of the tunable optical bandpass filter can be varied within a range from $\lambda_1$ to $\lambda_n$.

17. The apparatus as claimed in claim 10, wherein the tunable optical bandpass filter is an optical filter including a half symmetric cavity resonator constructed as a microelectromechanical system (MEMS).

18. A method for monitoring optical signal to noise ratio (OSNR) of wavelength division multiplexed optical signals having center wavelengths of $\lambda_1, \ldots, \lambda_i, \ldots, \lambda_n$ (i=1,2,...,n) in a wavelength division multiplexing optical transmission system,
- separating an optical signal that passed through a polarization controller and a tunable optical bandpass filter into a first optical signal and a second optical signal by a directional coupler;
- scanning the center wavelength $\lambda_v$ of the tunable optical bandpass filter and, when $\lambda_v$ conforms to a center wavelength of an optical signal for which an OSNR is to be measured, obtaining power ($P_1$) of the first optical signal and power ($P_2$) which is the minimum power of the second optical signal measured after passing through a linear polarizer;
- shifting $\lambda_v$ from $\lambda_i$ by a predetermined distance and obtaining power ($P_3$) of the first optical signal and power ($P_4$) which is the minimum power of the second optical signal measured after passing through a linear polarizer; and
- obtaining the OSNR using the powers of $P_1$, $P_2$, $P_3$ and $P_4$.

19. The method as claimed in claim 18, wherein when a transmission rate of the optical signal is R Gbps, the predetermined distance by which $\lambda_v$ is shifted from $\lambda_i$ is 0.3~3R GHz.

20. The method as claimed in claim 18, wherein the first optical signal and the second optical signal are separated by a 1:1 directional coupler, and the OSNR is obtained by the following equations:

$$\varepsilon = \frac{(P_2 - P_4)}{(P_1 - P_3 + P_2 - P_4)},$$

$$P_{S1} = \frac{(P_1 - 2P_2)}{(1 - 3\varepsilon)},$$

$$OSNR = \frac{(P_1 - 2P_2)}{2(1 - 3\varepsilon)(P_2 - P_{S1})} \frac{B_0}{B_r},$$

where $B_r$ (nm) is a resolution, which is a reference bandwidth used to determine the power of amplified spontaneous emission (ASE) noise for calculating the OSNR, and $B_0$ is a bandwidth (nm) of the tunable optical bandpass filter.

21. A method for monitoring optical signal to noise ratio (OSNR) of wavelength division multiplexed optical signals having center wavelengths of $\lambda_1, \ldots, \lambda_i, \ldots, \lambda_n$ (i=1,2,...,n) in a wavelength division multiplexing optical transmission system,
- separating an optical signal that has processed by a polarization controller and a tunable optical bandpass filter by using a polarization beam splitter into a first optical signal and a second optical signal respectively having a polarization state orthogonal to each other;
- scanning a center wavelength $\lambda_v$ of the tunable optical bandpass filter and, when $\lambda_v$ conforms to a center wavelength $\lambda_n$ of an optical signal for which an OSNR is to be measured, obtaining power ($P_1$) of the first optical signal having a polarization state conforming to a polarization state of the polarization controller and power ($P_2$) of the second optical signal having a polarization state orthogonal to the polarization state of the polarization controller;
- shifting $\lambda_v$ from $\lambda_i$ by a predetermined distance and obtaining power ($P_3$) of the first optical signal having a polarization state conforming to the polarization state of the polarization controller and power ($P_4$) of the second optical signal having a polarization state orthogonal to the polarization state of the polarization controller; and
- obtaining the OSNR using the powers of $P_1$, $P_2$, $P_3$ and $P_4$.

22. The method as claimed in claim 21, wherein when a transmission rate of the optical signal is R Gbps, the predetermined distance by which $\lambda_v$ is shifted from $\lambda_i$ is 0.3~3R GHz.

23. The method as claimed in claim 21, wherein the OSNR is obtained by the following equations:

$$\varepsilon = \frac{(P_2 - P_4)}{(P_1 - P_3 + P_2 - P_4)},$$

$$P_{S1} = \frac{(P_1 - P_2)}{(1 - 2\varepsilon)},$$

$$OSNR = \frac{(P_1 - P_2)}{2(1 - 2\varepsilon)(P_2 - P_{S1})} \frac{B_0}{B_r},$$

where $B_r$ (nm) is a resolution, which is a reference bandwidth to determine the power of amplified spontaneous emission (ASE) noise for calculating the OSNR, and $B_0$ is a bandwidth (nm) of the tunable optical bandpass filter.

* * * * *